Figure 1:
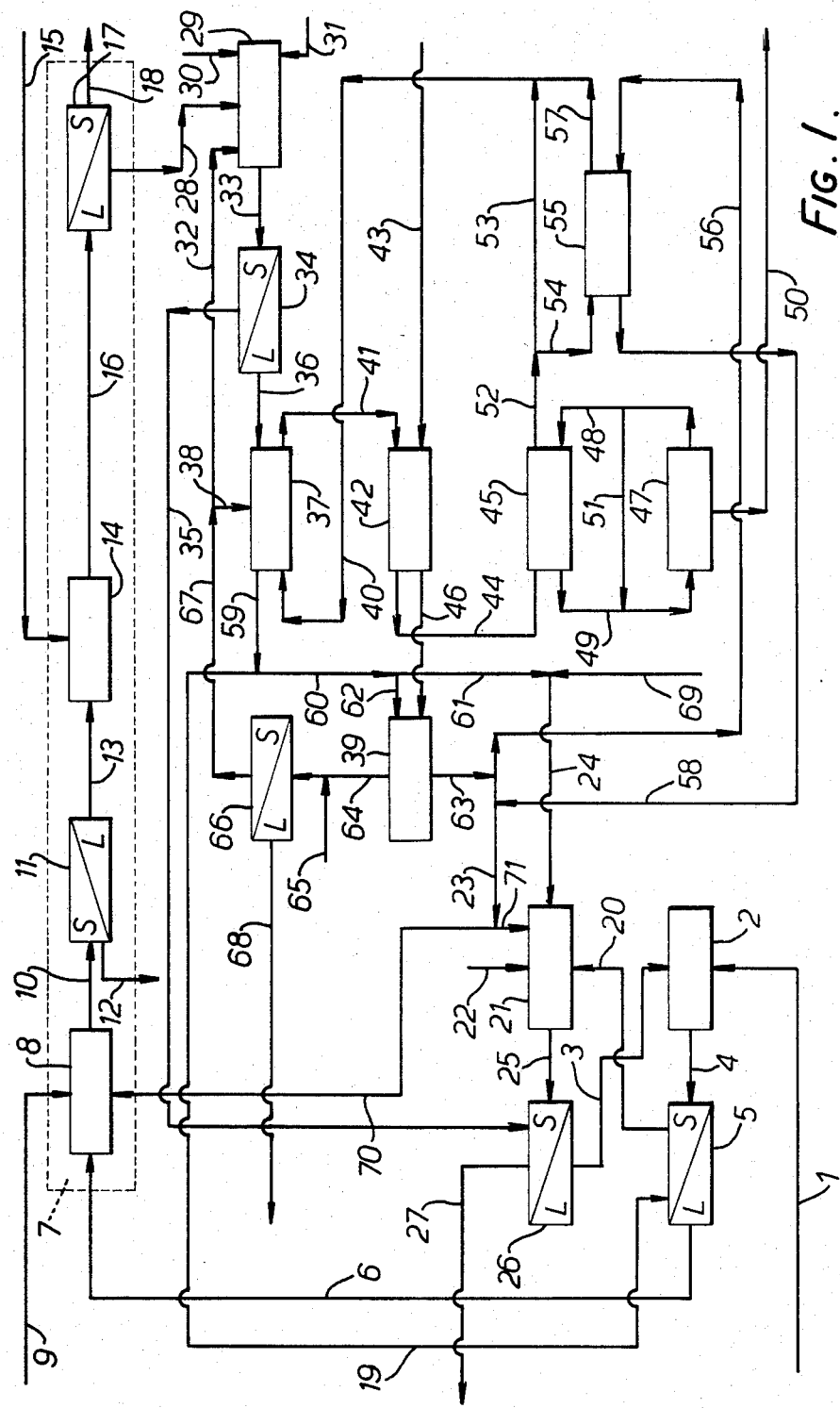

United States Patent [19]

Ochs et al.

[11] Patent Number: 4,536,214
[45] Date of Patent: Aug. 20, 1985

[54] METAL SULPHIDE EXTRACTION

[75] Inventors: Leonard R. Ochs; Archibald W. Fletcher, both of Tucson, Ariz.; Harald Weber, Isernhagen, Fed. Rep. of Germany; David Naden, Stockton-on-Tees, England

[73] Assignee: Duval Corporation, Tucson, Ariz.

[21] Appl. No.: 511,464

[22] Filed: Jul. 7, 1983

[51] Int. Cl.$^3$ .................. C01G 3/05; C01G 9/04; C22B 15/08; C22B 15/12
[52] U.S. Cl. .................... 75/101 R; 75/114; 75/120; 204/118; 423/109
[58] Field of Search ............ 423/109; 75/101 R, 114, 75/120; 204/118, 119

[56] References Cited

U.S. PATENT DOCUMENTS

| | | | |
|---|---|---|---|
| 704,639 | 7/1902 | Hoepfner | 75/108 |
| 3,776,826 | 12/1973 | Atadan | 75/117 |
| 4,148,698 | 4/1979 | Everett | 204/118 |
| 4,260,588 | 4/1981 | Piret et al. | 423/109 |
| 4,288,304 | 9/1981 | De Marthe et al. | 423/109 |
| 4,337,128 | 6/1982 | Haakonsen | 204/107 |
| 4,378,275 | 3/1983 | Adamson et al. | 75/120 |

FOREIGN PATENT DOCUMENTS 0081310  6/1983  European Pat. Off. ............ 119/

OTHER PUBLICATIONS

*Chemistry*, by John C. Bailar, Jr. et al., Academic Press, 1978, p. 543.

Primary Examiner—John Doll
Assistant Examiner—Jeffrey E. Russel
Attorney, Agent, or Firm—Bernard, Rothwell & Brown

[57] ABSTRACT

A process is described for recovering metal values from a zinc-containing complex sulphide material comprising leaching the material in a first leaching stage under non-oxidative conditions with a controlled amount of an aqueous chloride lixiviant solution containing cupric chloride in an amount which is selected so as to solubilize at least a part of the zinc in the material and to precipitate a quantity of cupric sulphide substantially equivalent on a molar basis to the zinc leached from the material, the lixiviant solution further containing sufficient of a source of chloride ions other than cupric chloride to ensure solubilization of metal chlorides present, recovering from the first leaching stage a zinc chloride-containing leach liquor, recovering metal values from said leach liquor in a metal recovery section, treating solids from the first leaching stage under oxidizing conditions in a second leaching stage with a liquor containing hydrochloric acid and metal chlorides thereby to solubilize further metal values from the solids, to precipitate iron values and to regenerate cupric chloride-containing lixiviant solution for use in the first leaching stage, and recovering from the second leaching stage (a) a solids residue consisting essentially of (i) iron values in the form of ferric hydroxide and jarosite and (ii) sulphur and that is substantially free from non-ferrous metal values and (b) a cupric chloride-containing lixiviant solution for recycle to the first leaching stage.

23 Claims, 2 Drawing Figures

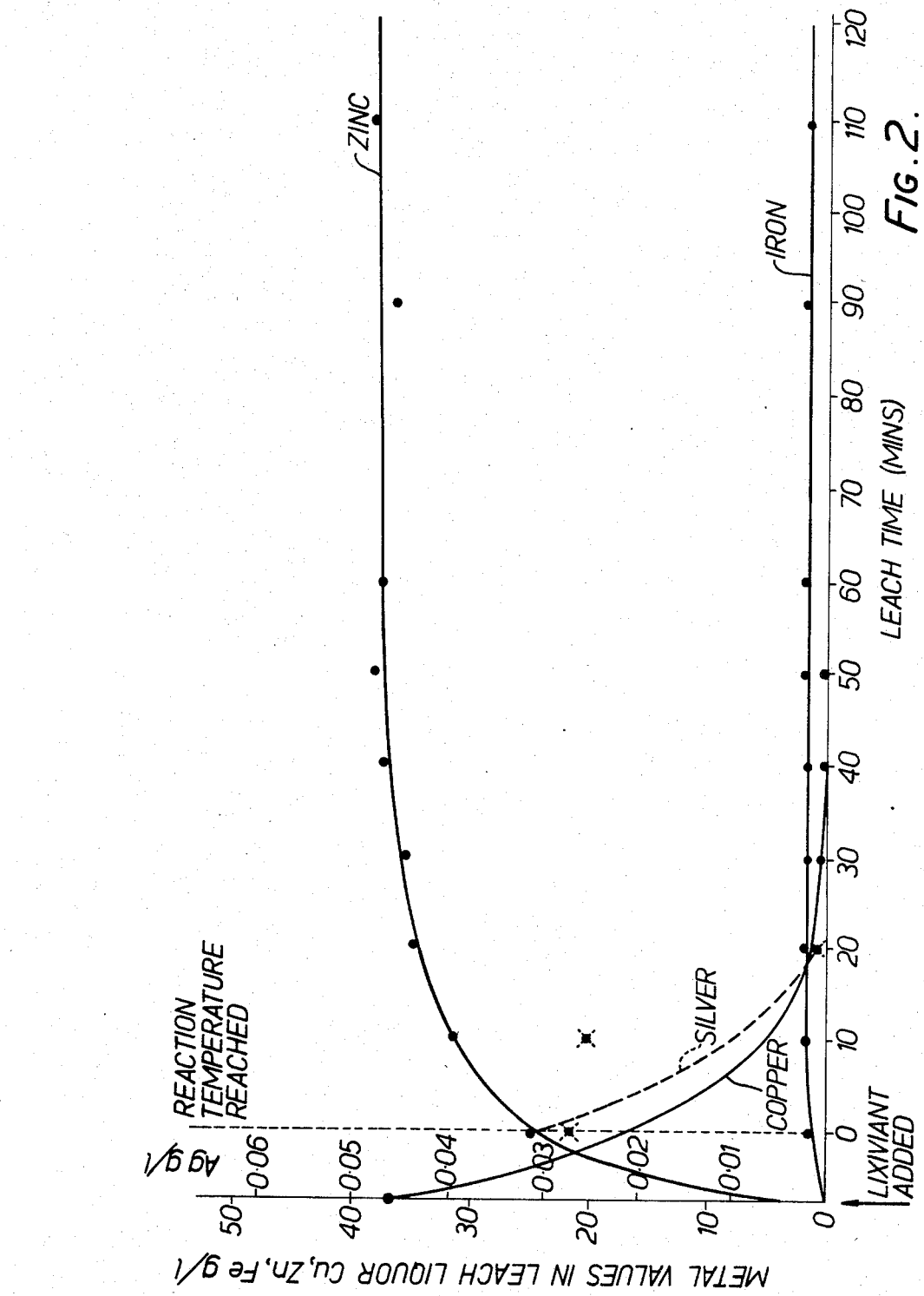

METAL SULPHIDE EXTRACTION

This invention relates to a process for recovering metal values from a zinc-containing complex sulphide material.

Complex metal sulphides are found in many parts of the world. Although some of these ores are amenable to pyrometallurgical techniques, the use of pyrometallurgical processes can only be considered if the sale of sulphuric acid is economically feasible. However, no single process will successfully treat multi-metal concentrates and expensive multi-smelter complexes are necessary, which are difficult to justify at prevailing metal prices, particularly for relatively small deposits that are frequently found. In addition, pyrometallurgical processes suffer from environmental drawbacks and expensive precautions must be taken to avoid atmospheric pollution through emission of dust and/or sulphur dioxide and/or trioxide.

Hydrometallurgical processes have assumed greater importance in recent years, particularly in areas in which the sale of sulphuric acid is not possible and where it is becoming increasingly difficult to meet environmental standards.

Typically, complex sulphide ores are intricate associations of chalcopyrite ($CuFeS_2$), galena ($PbS$), sphalerite ($ZnS$) and pyrite ($FeS_2$) or pyrrhotite ($Fe_{1-x}S$). These represent important resources of non-ferrous and precious metals. Because of their mineralogical associations and the texture of the ore, they present specific and difficult problems during most stages of their overall beneficiation, from mineral processing to extractive metallurgy. These difficulties arise by reason of the intergrown mineral association and fine grain size of the ore which mean that selective separation of the sulphides by flotation or other methods of concentration cannot be used.

Usually complex sulphide ores that are used as sources of non-ferrous and precious metals contain about 5% or more of non-ferrous metals. Of the non-ferrous metals those that are present in significant proportions tend to be zinc, followed by lead and then by copper. Typical compositions usually fall in the following ranges: Cu, 0.1–3%; Pb, 0.3–3%; Zn, 0.2–10%; Ag, 30–100 g/t; and Au, 0–10 g/t.

A review of processing options from complex sulphide ores to metals is given in a paper by G. Barbery et al at pages 135 to 150 of the Collected Papers of the Complex Sulphide Ores Conference, held in Rome, 5th to 9th Oct. 1980, and organized by The Institute of Mining and Metallurgy, in association with Consiglio Nazionale delle Ricerche Instituto per il Trattamento dei Minerali.

Another potential source of non-ferrous metals is the complex metal sulphide material that is found as a mud on the sea floor in certain parts of the world, such as parts of the Red Sea. Such muds are of hydrothermal origin.

There have been a variety of proposals for leaching complex metal sulphide materials with chloride-containing lixiviants. Such leaching processes usually rely on the presence of a transition metal cation in the circulating lixiviant solution which participates in the leaching process and changes valency during the course of leaching. For example two stage leaching of chalcopyrite and other copper-containing materials by ferric chloride oxidation thereof to produce cupric chloride, reduction of the cupric chloride to cuprous chloride, recovery of metallic copper by electrolysis, and regeneration of ferric chloride by oxidation with concurrent purge of iron is described in U.S. Pat. Nos. 3,785,944 and 3,879,272. Cupric chloride leaching of sulphur- and zinc-containing ores or concentrates for the recovery of zinc therefrom is described in British Patent Specification No. 1502404 and in U.S. Pat. No. 4,288,304.

It is an object of the present invention to provide a hydrometallurgical process for recovery of metal values from zinc-containing complex sulphide materials which enables the proven technology of zinc sulphate electrolysis to be used for recovery of zinc from the resulting leach liquor. It is a further object of the invention to provide a hydrometallurgical process for efficient recovery of non-ferrous metal values from a zinc-containing sulphide material in which the sulphide content is recovered as elemental sulphur and in which at least a major part of the iron content of the sulphide material appears in the solid residue from the leaching stages.

According to the present invention there is provided a process for recovering metal values from a zinc-containing complex sulphide material comprising leaching the material in a first leaching stage under non-oxidative conditions with a controlled amount of an aqueous chloride lixiviant solution containing cupric chloride in an amount which is selected so as to solubilize at least a part of the zinc in the material and to precipitate a quantity of cupric sulphide substantially equivalent on a molar basis to the zinc leached from the material, the lixiviant solution further containing sufficient of a source of chloride ions other than cupric chloride to ensure solubilization of metal chlorides present, recovering from the first leaching stage a zinc chloride-containing leach liquor, recovering metal values from said leach liquor in a metal recovery section, and treating solids from the first leaching stage under oxidizing conditions in a second leaching stage with a liquor containing hydrochloric acid and metal chlorides thereby to solubilize further metal values from the solids, to precipitate iron values and to regenerate cupric chloride-containing lixiviant solution for use in the first leaching stage.

The zinc-containing sulphide material may be any of the complex metal sulphides described above. Complex metal sulphide ores should be finely comminuted and, if possible, concentrated prior to leaching. Complex sulphide muds are preferably de-watered at least in part prior to leaching, e.g. down to a solids content of about 50% w/w (weight-by-weight).

In the first leaching stage the zinc-containing complex sulphide material is leached with an aqueous chloride lixiviant solution containing cupric chloride and sufficient of a source of chloride ions other than cupric chloride to ensure solubilization of metal values present. Chlorides of other metals, e.g. cobalt, nickel, silver and gold, will also be present when the sulphide material contains these metals. In this step soluble cupric chloride entering the first leaching stage is converted to insoluble cupric sulphide in an amount equivalent to the quantity of zinc dissolved, whilst any cupric chloride not so converted is reduced to cuprous chloride. The concentration of cupric chloride in the lixiviant entering the first leaching stage tends to adjust itself in operation of the process towards an equilibrium value such that the quantity of cuprous chloride in the leach liquor from the first leaching stage is equivalent to the copper content of the sulphide material being leached. In this way subjection of the cuprous chloride-containing leach liquor to a cementation step can give rise to an essentially copper free solution which can be passed forward for zinc recovery.

In the first leaching stage zinc is selectively leached from the complex sulphide material and replaced by cupric ion according to the overall reaction:

$$ZnS + CuCl_2 = ZnCl_2 + CuS$$

Possibly this reaction occurs in two stages:

$$2CuCl_2 + ZnS = ZnCl_2 + 2CuCl + S \qquad 1.$$

$$2CuCl + S = CuS + CuCl_2 \qquad 2.$$

If the complex sulphide material contains iron, then leaching of iron may also occur:

$$2CuCl_2 + FeS = FeCl_2 + 2CuCl + S$$

Other metal values that are present in the complex sulphide material, e.g. cadmium and lead, may be at least partially leached at the same time by analogous reactions.

The use of elevated temperatures is preferred in the first leaching stage. Preferably the temperature is at least about 40° C. to about 150° C., temperatures in the range of from about 60° C. to about 120° C. being especially preferred.

Usually it will be preferred to use as low a temperature as is possible, consistent with obtaining efficient leaching of zinc, so as to reduce the extent of leaching of iron from the sulphide material in the first leaching stage. Hence it will usually be desirable to use leaching temperatures in the range of from about 70° C. to about 110° C. Conveniently leaching is conducted at the natural boiling point of the liquor at atmospheric pressure.

Leaching is conducted under non-oxidative conditions in the first leaching stage, i.e. preferably in the absence of oxygen. Hence it is desirable to exclude air from the first leaching stage.

The aqueous chloride lixiviant solution contains, in addition to cupric chloride, sufficient of a source of chloride ions other than cupric chloride to ensure solubilization of metal chlorides present. The source of such chloride ions may comprise sodium chloride, potassium chloride, calcium chloride, magnesium chloride, or a mixture of two or more thereof, for example a mixture of sodium and/or potassium chloride and one or both of magnesium chloride and calcium chloride. When working with muds from the sea bottom e.g. a complex metal sulphide mud from the sea bottom of the Red Sea, sodium chloride and other soluble chlorides can enter the system in the sea water associated with the partially de-watered mud.

The total chloride ion concentration in the aqueous chloride lixiviant solution supplied to the first leaching stage from the second leaching stage is preferably in excess of about 2 moles per liter. The upper limit of chloride ion concentration is not particularly critical but will not be so high as to cause precipitation of metal chlorides. Usually the total chloride ion concentration, including that associated with cupric chloride, ranges from about 2 to about 10 moles per liter or up to the solubility limit of chloride ions in the leach liquor under the operating conditions selected, whichever is the lower. Typically the total chloride ion concentration is from about 4 to about 6 moles per liter, e.g. about 5 moles per liter.

Preferably the concentration of cupric chloride in the lixiviant solution ranges from about 0.4M to about 1.2M.

It will usually be preferred to choose a ratio of the lixiviant solution to the material subjected to leaching in the first leaching stage so as to cause solubilization of from about 25% to 100% of the zinc present in the material.

The period required for leaching in the first leaching stage may vary within wide limits, e.g. from about 5 minutes to about 100 minutes, e.g. about 20 minutes.

Leaching can be carried out in the first leaching stage on a batch basis but is preferably conducted on a continuous basis.

From the first leaching stage there are recovered a solids residue comprising mainly CuS, $CuFeS_2$ and FeS, together with most of the cobalt, nickel, silver and gold compounds in the sulphide material, and a leach liquor containing, in addition to the source of chloride ions, e.g. magnesium chloride, at least one non-ferrous metal chloride, the non-ferrous metal being selected from zinc, copper, lead, cobalt, nickel, silver and gold. After a period of continuous operation the concentrations of the non-ferrous metal or metals tend to reach equilibrium values equivalent to the corresponding metal ion content of the sulphide material. In addition the leach liquor may also contain a small amount of ferrous ions. Due to the presence of excess chloride ions in the lixiviant solution, such non-ferrous metal chlorides are solubilized as chloro-complex ions.

The mixture of leach liquor and insoluble solids residue from the first leaching stage will usually be recovered therefrom as a slurry which is then filtered, possibly with an initial thickening stage. The solids residue is passed on, conveniently in slurry form, to the second leaching stage.

The leach liquor from the first leaching stage is passed on to a metal recovery section. This preferably includes a solvent extraction stage, i.e. a liquid-liquid extraction stage, for recovery of the zinc present.

The metal recovery section will be described in more detail hereinafter.

In the second leaching stage the solids residue from the first leaching stage is leached under oxidizing conditions with a liquor containing hydrochloric acid and metal chlorides thereby to solubilize further metal values from the solids, to precipitate iron values and to regenerate cupric chloride-containing lixiviant for use in the first leaching stage. This liquor preferably comprises raffinate from the solvent extraction stage. The amount of hydrochloric acid in this liquor desirably corresponds approximately to the stoichiometric quantity required for leaching the non-ferrous metal content of the complex sulphide material being leached.

In the second leaching step of the process of the invention the major reactions can be summarised in this case as follows:

$$CuS + 2HCl + \tfrac{1}{2}O_2 = CuCl_2 + H_2O + S;$$

and $$CuFeS_2 + 4HCl + O_2 = CuCl_2 + FeCl_2 + 2H_2O + 2S$$

In addition further dissolution of zinc values may occur if the solids residue from the first leaching stage still contains appreciable amount of zinc:

$$ZnS + 2HCl + \tfrac{1}{2}O_2 = ZnCl_2 + H_2O + S.$$

The amount of HCl supplied to the second leaching stage in this mode of operation can be determined by calculating the stoichiometric requirement of leachable non-ferrous metal content, for example the copper and zinc, e.g. as follows:

$$ZnS + 2HCl + \tfrac{1}{2}O_2 = ZnCl_2 + H_2O + S;$$

$$CuS + 2HCl + \tfrac{1}{2}O_2 = CuCl_2 + H_2O + S.$$

The hydrochloric acid required in the second leaching stage in this first preferred mode of operation can be imported to the plant from beyond battery limits. Alternatively the HCl required can be generated by high temperature hydrolysis of a suitable chloride-containing liquor from the process in a suitable plant, such as a spray-roasting plant. In such a high temperature hydrolysis step the liquor typically contains magnesium ions and may, for example, comprise a stream from the solvent extraction stage used for zinc recovery in the metal recovery stage of the process of the invention. The overall reaction is:

$$MgCl_2 + H_2O = MgO + 2HCl.$$

Thus the liquor subjected to high temperature hydrolysis may comprise the raffinate from the solvent extraction stage if a single stage extraction using a cationic transport agent, such as di-2-ethylhexylphosphoric acid, is used and if a pH control agent selected from magnesium oxide, hydroxide, bicarbonate, carbonate and mixtures thereof is used. In the second leaching stage iron sulphide is completely oxidized and solubilized as ferric chloride which is then reprecipitated as ferric hydroxide and jarosite. Some oxidation of sulphur to sulphate may occur in the course of the second leaching stage. The precise mechanism for sulphate formation is unknown but it is suspected that the overall reaction is:

$$6CuCl_2 + S + 4H_2O = 6CuCl + H_2SO_4 + 6HCl.$$

The cuprous chloride is oxidized quickly with small traces of oxygen to cupric chloride according to the following equation, it is postulated:

$$6CuCl + 1\tfrac{1}{2}O_2 + 6HCl = 6CuCl_2 + 3H_2O$$

Alternatively the sulphate ion may be produced by direct oxidation of a metal sulphide, e.g.:

$$MS + 2O_2 = MSO_4$$

In the presence of sulphate ions and of suitable cations, such as sodium ions, a jarosite may be precipitated according to the following reaction in the leach stage:

$$NaCl + 3FeCl_3 + 2MgSO_4 + 6H_2O = NaFe_3(SO_4)_2(OH)_6 + 2MgCl_2 + 6HCl.$$

Once this jarosite equilibrium has been established other iron oxides, mainly ferric hydroxide, are precipitated according to the following equation:

$$12FeCl_2 + 3O_2 + 2H_2O = 8FeCl_3 + 4FeOOH.$$

In the course of experimental work leading up to the present invention it has been observed that oxidation of sulphur to sulphate tends to occur to an increasing extent if high temperatures and high oxygen pressures are used and if extended leaching times are used in the second leaching stage. It would also appear desirable to operate the second leaching stage at a pH of between about 0.1 and about 1.0, preferably between about 0.3 and about 0.8, e.g. to about 0.5, in order to minimize sulphate formation. Hence careful pH control in the second leaching stage is desirable, as are also the selection of minimum temperatures, pressures and leaching times consistent with the desired recovery of copper as cupric chloride, if sulphate formation is to be minimized.

It is preferred to use elevated temperatures in the second leaching stage, for example temperatures of from about 40° C. to about 180° C., preferably in the range of from about 100° C. to about 160° C. Leaching in the second stage is effected under oxidative conditions which conveniently comprise the use of molecular oxygen in the form of air, oxygen-enriched air or pure oxygen. The use of pure oxygen is preferred. Although leaching can be effected at atmospheric pressure, it is preferred to operate the second leaching stage under an elevated partial pressure of oxygen, for example, under an oxygen partial pressure in the range of from about 15 psig to about 250 psig (about 103 kPag to about 1725 kPag). At all events the oxygen partial pressure should be selected in relation to the operating temperatures in the second leaching stage so as to exceed the vapour pressure of the solution.

The residence time for the solids in the second leaching stage may vary within wide limits, for example from about 5 minutes up to about 12 hours or more. Usually, however, it will be preferred to conduct leaching for a period, in the range of from about 15 minutes up to about 180 minutes e.g. about 30 minutes.

In the metal recovery stage the liquor, prior to passage to the solvent extraction stage, will usually first be subjected to a cementation stage for the recovery of one or more of the non-ferrous metals, copper, silver, gold, nickel, cadmium, lead and cobalt. The liquor supplied to the cementation stage is usually substantially in reduced form, that is to say substantially all metal ions contained therein capable of existing in two or more oxidation states are in a reduced state rather than in their highest oxidation state.

Prior to, or subsequent to, cementation the liquor may be subjected to an iron removal step.

Cementation may be conducted by adding to the leach liquor a cementation agent, such as zinc dust. Cementation may be effected in one or more stages. Preferably the cementation agent is added in excess of the stoichiometric amount required to precipitate the desired non-metal content, e.g. copper, silver, gold etc.

In the cementation stage the metal added as cementation agent replaces any metal present in solution that is below it in the electrochemical series (as set out, for example, in Table 13-1 on page 228 of "Principles of Extractive Metallurgy—Volume 2 Hydrometallurgy" by Fathi Habashi, published by Gordon and Breach in 1969). Such reactions can be exemplified by cementation of copper by zinc (which has a published positive electrode potential, $Zn/Zn++$, of $+0.763$ volts) according to the following equation:

$$CuCl_2 + Zn = ZnCl_2 + Cu.$$

When using zinc dust as the cementation agent for treating the leach liquor from the first leaching stage of the process of the present invention performed upon a mud from the ocean bed, more particularly a mud from the bottom of the Red Sea, it has been found desirable to effect cementation in at least two stages. In this way a cement rich in the noble non-ferrous metals (e.g. Au, Ag, Pt and Cu) can be recovered separately from the less noble non-ferrous metals (e.g. Pb, Cd, Ni, Co, etc.). Subsequent cementation stages can be used to eliminate impurities from the solution which would otherwise tend to be co-extracted with zinc in the subsequent solvent extraction stage, to pass to the zinc electro-winning step, and possibly to interfere therewith.

In one preferred process according to the invention the noble non-ferrous metals are precipitated and removed from the leach liquor in one or more cementation stages, e.g. in two cementation stages, and then the less noble non-ferrous metals are removed and recovered in one or more polishing, cementation stages. In the noble non-ferrous metal cementation stage or stages it is preferred to use from about 1 to about 2 times the stoichiometric amount of zinc dust required for cementation, e.g. about 1.5 times the stoichiometric amount. In the polishing stages of cementation it is desirable to use in excess of twice the stoichiometric requirement for all non-zinc metal ions, e.g. up to about 5 times the stoichiometric requirement, more particularly about 2.5 times the stoichiometric requirement for all non-zinc metal ions. Preferably the particle size of the zinc dust used in the second and any subsequent cementation stage is finer than that used in the first stage.

Cementation is conducted at atmospheric pressure and is effected at normal or elevated temperatures, e.g. in the range of from about 30° C. up to about 100° C. or more. Prior to cementation any lead chloride that precipitates due to cooling the leach liquor is separated by filtration or centrifugation. The cementation stages can be operated at different temperatures, for example the noble non-ferrous metal cementation stage or stages can be operated at temperatures of up to about 50° C., e.g. at a temperature of about 40° C., and the second or any subsequent cementation stage to recover less noble non-ferrous metals at higher temperatures, e.g. at a temperature of about 80° C. The residence time of the liquor in the cementation stage may vary within wide limits, e.g. from about 5 minutes up to about 90 minutes or more. Usually it will suffice to use a residence time of about 30 minutes in the cementation stage or, if there is more than one cementation stage, in each of the cementation stages.

Addition of excess cementation agent, above the stoichiometric amount required to precipitate the non-zinc non-ferrous metals present results in increase of pH. Desirably the amount of cementation agent added is controlled so that the pH does not rise above about 4.0. The composition of the cementate formed depends to some extent upon the pH of the solution and upon the stoichiometry of zinc addition. Thus it has been found desirable to control the pH of the feed liquor supplied to the cementation stage, if there is only a single cementation stage, or the first cementation stage, if there is more than one cementation stage, in the range of from about 0.5 to about 1.0 in order to recover a noble non-ferrous metal product that is substantially uncontaminated by less noble non-ferrous metals. For example, it has been found that at low pH's, e.g. of the order of about 0.5 to about 1.0, with zinc addition equivalent to, or less than, the amount required to precipitate all the copper, the silver and gold content of the cementate is high but copper recovery is low. If the pH during cementation is allowed to rise higher than about 1.0, copper recovery tends to improve but the silver content of the cementate drops. Advantage of this pH and zinc addition rate dependence can be taken by conducting the noble non-ferrous metal cementation in two or more stages and recovering cementates of different composition. Usually, however, it will be preferred to select cementation conditions in the first cementation step which result in high silver and copper recovery with minimum precipitation of other non-ferrous metals, these other non-ferrous metals (e.g. Co, Ni, Cd, Pb etc) being recovered in a second or polishing cementation step. If desired, antimony oxide or arsenic oxide can be added as catalyst in the second or in any polishing cementation step. In any polishing cementation step the pH is desirably controlled to lie below about 4.0 so as to remove and recover from the liquor the less noble metals, other than iron (e.g. Pb, Cd, Ni, Co, etc.). Iron can be purged from the solution in a final cementation stage by adding a sufficient quantity of zinc dust as cementation agent, for example about 2.5 times the stoichiometric amount of zinc dust required theoretically to precipitate the iron content of the liquor, whilst controlling the pH of the solution at about 4.5 or higher.

Following cementation the resulting slurry is filtered off possibly following a thickening stage. The clear liquor from the cementation stage may still contain iron and is then passed on to an iron purge stage.

Iron removal, whether this is undertaken prior to, or subsequent to, cementation may be effected by a procedure in which residual iron is precipitated by oxidation of any ferrous ions present to the ferric state together with addition of a suitable alkali, e.g. magnesium oxide, magnesium hydroxide, magnesium carbonate, dolomite, calcium hydroxide, quick lime or limestone, in order to precipitate resulting ferric ions in oxide or hydrated oxide form. Use of a calcium-containing alkali material in the iron purge stage has the additional advantage that precipitation of some of the sulphate as calcium sulphate occurs, which assists in controlling the sulphate ion concentration in the circulating liquor. Such sulphate ions may arise through sulphur oxidation in the second leaching stage.

Oxidation of ferrous to ferric ions in the iron purge stage can be achieved by use of atmospheric oxygen or preferably, of pure oxygen, preferably under pressure and at elevated temperature. Typical reaction conditions include use of oxygen partial pressures in the range of from about 15 psig to 250 psig (about 103 kPag to about 1725 kPag) and of temperatures in the range of from about 50° C. to about 250° C.; the temperature and pressure combination should be selected so that the oxygen partial pressure exceeds the vapour pressure of the solution. If desired a flocculant can be added to the resulting pulp to facilitate settlement of iron hydroxide. The residence time of the liquor in the iron purge stage may vary within wide limits, e.g. from about 5 minutes up to about 12 hours or more. Conveniently, however, the residence time is from about 30 minutes up to about 2 hours. In the iron purge stage the pH of the solution is preferably in excess of about 1.5, e.g. in the range of from about 1.5 to about 4.0. After filtration of the pulp resulting from the iron purge step, possibly preceded by a thickening stage, the solids materials are conveniently combined with the residue from the oxidation leach stage prior to washing thereof.

The liquor, following cementation and iron removal in either order, now contains (in addition to magnesium chloride and other soluble chloride such as sodium chloride, potassium chloride and/or calcium chloride), predominantly zinc chloride. This is then subjected to a solvent extraction stage using a cationic transport agent for zinc. Such cationic transport agents are organic compounds which are soluble in organic hydrophobic solvents, such as kerosene, and are capable of forming organic-soluble complexes with cationic species. Examples of cationic zinc transport agents include high molecular weight carboxylic acids, for example those containing more than 8 carbon atoms, halogenated fatty acids and alkyl-substituted phosphoric acids. A convenient cationic zinc transport agent is di-2-ethylhexyl-phosphoric acid.

The organic hydrophobic extractant phase contains in addition to the zinc transport agent a solvent which acts as a carrier for the transport agent and reduces the viscosity of the organic phase. Typical solvents include hydrocarbons or distilled petroleum fractions of the kerosene type or of a similar nature. In addition a modifier solvent can be added to the organic phase with a view to facilitating phase separation during extraction. Such a modifier can be, for example, an aliphatic alcohol containing from about 8 to about 14 carbon atoms or an alkyl phosphate ester. Typically the modifier is isodecanol.

Taking, for example, the use of di-2-ethylhexylphosphoric acid as zinc transport agent, the extraction of zinc proceeds according to the following reaction:

$$\underset{\text{aqueous}}{ZnCl_2} + \underset{\text{organic}}{2XH} = \underset{\text{organic}}{ZnX_2} + \underset{\text{aqueous}}{2HCl}$$

where X is the di-2-ethylhexylphosphate ion. The exchanged hydrogen ion suppresses the reaction and must be removed if the reaction is to go to completion. This can be carried out by the addition of magnesium oxide, lime or milk of lime. Magnesium oxide can be produced on site, as will be described in more detail below, by high temperature hydrolysis of a suitable magnesium-containing liquor. Reaction of magnesium oxide with di-2-ethylhexylphosphoric acid can be carried out prior to contact of the organic extractant phase with the aqueous feed liquor. In this case the extraction of zinc proceeds in two stages as follows:

$$\underset{\text{solid}}{MgO} + \underset{\text{organic}}{2XH} = \underset{\text{organic}}{MgX_2} + \underset{\text{aqueous}}{H_2O}$$

$$\underset{\text{aqueous}}{ZnCl_2} + \underset{\text{organic}}{MgX_2} = \underset{\text{organic}}{ZnX_2} + \underset{\text{aqueous}}{MgCl_2}.$$

Alternatively magnesia can be added as a slurry to the aqueous phase during zinc extraction, or between stages, as follows:

$$\underset{\text{aqueous}}{ZnCl_2} + \underset{\text{solid}}{MgO} + \underset{\text{organic}}{2XH} = \underset{\text{organic}}{ZnX_2} + \underset{\text{aqueous}}{MgCl_2} + \underset{\text{aqueous}}{H_2O}$$

The result is the same in each case, the extraction being carried out with little or no pH change. Extraction accordingly proceeds to completion and magnesium chloride is regenerated.

Similar equations can be written for the case when lime or milk of lime is used. Again little or no change of pH occurs during extraction and calcium chloride is regenerated. In the solvent extraction step the zinc chloride liquor to be extracted preferably has a pH in the range of from about 1.5 to about 4.0, more preferably in the range of from about 1.8 to about 2.5, e.g. about 2.0.

The zinc-loaded organic extractant phase is then washed, using a solution maintained at a pH in the range of from about 2.5 to about 3.5. e.g. about 3.0, by addition of acid, to remove alkali metal and alkaline earth metal ions and transition metal impurity ions, which have survived the cementation and iron purge stages and which may be present in the feed solution to the solvent extraction stage. Such transition metal ions, if passed to the zinc electrowinning stage even in trace amounts, could interfere with zinc electrowinning. Finally the organic phase is washed with water to remove chloride ions and is then passed to a zinc strip stage. In this strip stage the organic phase is contacted with a solution containing sulphuric acid. Conveniently the strip solution is spent electrolyte solution from a subsequent electrolysis step. The resulting zinc-loaded strip solution can then be passed forward to electrolysis according to conventional practice.

The stripped organic phase can then be recycled to the extraction stage, possibly following a washing stage using hydrochloric acid to strip iron from the organic extractant phase.

The aqueous raffinate from the solvent extraction stage contains, in addition, to trace amounts of zinc chloride, predominantly magnesium chloride and sodium chloride. Part of this may be recycled to the second leaching stage. Another part may be subjected to high temperature hydrolysis at temperatures of, for example, from about 400° C. to about 900° C., thereby to generate hydrogen chloride and magnesium oxide. If the raffinate contains appreciable quantities of sodium salts it is best not to exceed a temperature of about 800° C. in the high temperature hydrolysis stage so as to avoid fusion of the sodium salts. Typically high temperature hydrolysis is carried out in a spray roasting stage. The proportion of the raffinate passed to the spray roasting stage is desirably selected to produce the quantity of hydrogen chloride to be supplied to the second leaching stage and the equivalent amount of magnesium oxide which can be used for neutralisation of the di-2-ethylhexylphosphoric acid in the solvent extractions stage. If desired the amount of magnesium oxide used in the high temperature hydrolysis step may exceed the amount required for neutralisation of di-2-ethylhexyl-phosphoric acid in which case the excess may be passed to the iron purge stage for neutralisation purposes.

It will be appreciated that the amount of magnesium oxide required for neutralisation of the cationic extractant is equivalent to the quantity of zinc extracted by the organic extractant phase in the solvent extraction stage.

In the high temperature hydrolysis stage any impurities which are not removed in the cementation stage and which would otherwise tend to build up in the circulating liquor do not hydrolyse with the magnesium chloride and will report with, i.e. appear as impurities in the magnesium oxide. Such impurities may be removed from the magnesium oxide by washing and thus purged from the system. For instance, any sulphate present will report as, for example, magnesium sulphate or sodium sulphate. These soluble sulphates can be washed from the magnesium oxide and purged from the system. Hence the spray roasting step, or other form of high temperature hydrolysis step can play a very important part in purifying the circulating liquor.

The hydrogen chloride liberated in the high temperature hydrolysis step can be passed as such to the second leaching stage. Preferably, however, it is first dissolved in a suitable aqueous medium, e.g. raffinate from the solvent extraction stage. The spent wash water used to wash the zinc-loaded organic extractant phase can also be used for absorption of hydrogen chloride.

Although theoretically no magnesium is lost from the system, in practice some loss of magnesium with the residue from the second leaching stage is unavoidable. Accordingly it will usually be necessary to supply make up magnesium chloride to the system. Conveniently this is added to the leach liquor from the first leaching stage prior to cementation. Part of the magnesium chloride may be made up by adding to the circuit magnesium carbonate or magnesium oxide and sodium chloride equivalent to the quantity of sulphate produced in the second leaching step. The sulphate ion, however produced, will result in a hydrogen ion imbalance in the circuit which may be used to solubilise the magnesium oxide or carbonate as follows:

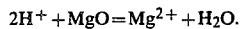

$$2H^+ + MgO = Mg^{2+} + H_2O.$$

The sulphate ion can be removed from the circuit by addition of calcium chloride to the liquor at some convenient point in the process, for example in the iron elimination stage.

In order that the invention may be clearly understood and readily carried into effect a preferred form of non-ferrous metal extraction plant embodying a preferred process according to the present invention will now be described, by way of example only, with reference to the accompanying diagrammatic drawings in which FIG. 1 is a flow sheet of a plant constructed to operate a process according to the present invention, and FIG. 2 summarises the results of leaching in a typical first stage leaching step.

It will be appreciated by those skilled in the art that each flow sheet illustrates only the main process features of the plant and that many additional items of equipment, e.g. pumps, valves, holding tanks, pH measuring equipment, heaters, pressure control valves, temperature measurement equipment, and the like, will be required in an operational plant. Such items of equipments will be provided in accordance with conventional chemical engineering practice and form no part of the present invention.

Referring to FIG. 1 of the drawings, a partially de-watered mud dredged from the bottom of the Red Sea is fed as a slurry in sea water containing about 50% by weight solids by way of line 1 to a reduction leach stage 2 in the form of an autoclave which is fitted with a suitable stirrer. Aqueous lixiviant is fed in line 3 to reduction leach autoclave 2. This lixiviant contains cupric chloride and sufficient of a source of chloride ions (other than cupric chloride) to ensure solubilisation of metal chlorides present. This source of chloride ions comprises approximately 160 g/l magnesium chloride and approximately 40 g/l sodium chloride. The lixiviant will also contain small amounts of the complex chlorides of silver, gold, and other metals below copper in the electrochemical series that are present in the mud.

Typically, autoclave 2 and its contents are maintained at a temperature of 103° C. and at atmospheric pressure. Air is preferably excluded. The residence time in autoclave 2 is about 20 to 30 minutes.

In autoclave 2 the reduction leach step results in dissolution of zinc, lead and cadmium from the Red Sea mud, and in precipitation of a quantity of cupric sulphide substantially equivalent to the zinc and other metal ions leached from the mud, to give a residue comprising this cupric sulphide and undissolved sulphides present in the mud.

The resulting leached pulp is passed by way of line 4 to a filter press 5 by way of a thickener (not shown). Provision may be made for adding a flocculant to the pulp to facilitate subsequent solids/liquid separation.

From filter press 5 the primary filtrate or leach liquor, which has a pH of from about 2.0 to about 2.5, is fed in line 6 to the first stage of a metal recovery section. This first metal recovery stage comprises a cementation stage 7. Cementation is carried out in two steps. In the first cementation vessel 8 a quantity of zinc dust is added by way of line 9 equivalent to 1.5 times the stoichiometric amount required to precipitate the copper and silver content of the leach liquor. In the first cementation step the pH of the feed liquor is controlled by addition of hydrochloric acid in line 70 within the range of from about 0.5 to about 1.0 and the temperature at about 40° C.

From first cementation vessel 8 the resulting pulp passes on by way of line 10 to a separation stage 11, consisting of a settling tank and a further filter press, the precious metal-containing cementate, which contains substantially all the silver, gold and copper present in the leach liquor, being recovered as indicated by line 12. The liquor from separation stage 11, which now has a pH in the range of from about 0.5 to about 1.0, is passed by way of line 13 to a second cementation vessel 14, to which zinc dust is added by way of line 15, to precipitate the less noble non-ferrous metals present (e.g. Pb, Co, Cd, Ni, etc.). The amount of zinc dust added via line 15 is about 2.5 times the stoichiometric amount required to precipitate such less noble non-ferrous metals. The temperature in second cementation vessel 14 is about 80° C. and the pH is controlled in the range of from about 3.0 to about 4.0 or higher. The slurry formed in second cementation vessel 14 is passed on through line 16 to a further separation stage 17, also consisting of a settling tank and a filter press, the less noble non-ferrous metal concentrate being recovered by way of line 18.

The solids obtained by de-watering the leach pulp in filter press 5 are re-slurried with aqueous raffinate from the metal recovery section in line 19, the resultant slurry being passed by way of line 20 to oxidation leach autoclave 21. This is fitted with a stirrer and is supplied with oxygen under pressure by way of line 22, with hydrochloric acid by way of lines 23 and 71, and with recycled chloride-containing raffinate in line 24. The reaction temperature is 120° C., the reaction pressure is 60 psig (414 kPag) and the residence time is 30 minutes. The quantity of hydrochloric acid is equivalent to the stoichiometric requirement for the leaching reactions. Under these conditions the remainder of the non-ferrous metal values contained in the reduction leach residue are dissolved and a major proportion of the iron is eliminated from the solution as ferric hydroxide. The resulting slurry is passed by way of line 25 to solids separation zone 26, e.g. a thickener, the liquid phase from which is passed by way of line 3 to first reduction leach stage 2 whilst the residue is passed on for disposal or for further treatment for removal of traces of precious metals, such as gold, in line 27.

From the settling tank of the second cementate separation stage 17 the liquor, which contains iron in the ferrous state and zinc, besides magnesium and sodium, but is now essentially free from dissolved copper, silver and gold, and other non-ferrous metals, passes by way of line 28 to an iron removal stage 29 which comprises a pressure reactor. This is supplied with oxygen by way of line 30 to oxidize any ferrous iron present to the ferric stage and with lime, crushed limestone, dolomite or magnesite by way of line 31 to cause precipitation of ferric hydroxide. Optionally recycled magnesium hydroxide slurry can be fed to iron purge stage 29 by way of line 32 from the spray roaster, which is further described below.

Solution containing the iron hydroxide precipitate is pumped by way of line 33 to a solid/liquids separation stage 34. Conveniently solids/liquid separation stage 34 comprises a thickener. If desired, a flocculant may be added to the contents of thickener 34 to ensure precipitation of iron values. Thickened precipitate from thickener 34 is passed as shown by line 35 to filter press 26 and is combined with the leach residue from autoclave 21 and washed simultaneously therewith as previously described.

Liquor overflowing from thickener 34 contains primarily zinc chloride, in addition to the chlorides present in the circulating liquor as solubilising chlorides, i.e. magnesium chloride and sodium chloride. Such sodium chloride enter the circuit in the mud supplied in line 1. This liquor passes by way of line 36 to extraction section 37 of a single solvent cycle solvent extraction plant. Extraction section 37 is a three stage, continuous, counter-current extractive battery, each stage of which is a conventional mixer-settler. The incoming pregnant liquor is arranged to flow in counter-current to the solvent phase which is a solution containing, for example,, 30% v/v di-2-ethylhexylphosphoric acid, 65% v/v kerosene, and 5% v/v iso-decanol. The overall aqueous: organic flow ratio is conveniently 2:1 by volume. Magnesium oxide supplied by way of line 38 from a spray roasting plant 39, which is described further below, is used to maintain the pH in the solvent extraction stages at about 2.0. When the magnesium salt of di-2-ethylhexylphosphoric acid is used for extraction the step of forming the magnesium salt of di-2-ethylhexylphosphoric acid is carried out in separate agitation tanks with an after-settler for separation of solvent phase and any aqueous phase or sludge. The solvent phase, containing the magnesium salt of the extraction agent, is pumped to the extractive battery from the after-settler. Recycled solvent phase, containing di-2-ethylhexylphosphoric acid as the free acid, is supplied to solvent extraction battery 37 in line 40.

Zinc-loaded solvent phase is passed via line 41 to a washing stage 42, which consists of mixer-settler units, in which the organic phase is scrubbed with water maintained at pH 3.0, supplied in line 43 in order to remove alkali metals and alkaline earth metals remaining in the organic phase, trace metals and entrained droplets of aqueous phase and hereby prevent contamination of the tank house feed in the subsequent electrolysis step which is described below. Washed solvent phase is pumped on from washing stage 42 in line 44 to strip stage 45, whilst effluent wash water from washing stage 42 is passed by way of line 46 to spray roaster 39 for absorption of hydrogen chloride, as will be described below.

In washing stage 42 the operating organic:aqueous phase ratio is 1:1 with an overall ratio of 10:1, i.e. there is recycle of wash water around the unit.

Solvent phase is stripped of zinc by contacting with a sulphuric acid-containing spent electrolyte, typically in a two stage, continuous, counter-current operation in strip stage 45. Again conventional mixer-settler units are used. The spent electrolyte is fed from a conventional zinc electro-winning plant 47 in line 48 to the strip stage 45. In strip stage 45 the aqueous:organic ratio is maintained at a value in the range of from about 2:1 to about 1:2, e.g. 1:1, by volume. Zinc-loaded strip liquor is recovered in line 49 and passed to tank house 47 for conventional electrolysis. Metallic cathodic zinc is recovered as shown by line 50. Part of this may be converted to dust for supply to the cementation stages in lines 9 and 15.

Reference numeral 51 indicates a tank house recycle line.

Stripped organic extractant phase is recovered from strip stage 45 in line 52 and can either be recycled to line 40 by way of line 53 or pass via line 54 to an acid wash stage 55 in which the organic extractant phase is washed with hydrochloric acid supplied via line 56 from the spray roaster 39. This acid washing step removes iron from the organic phase. The washed organic phase is recycled to solvent extraction stage 37 via lines 57 and 40. The hydrochloric acid used for washing is recycled to second leaching stage 21 in lines 58, 23, and 71.

Aqueous raffinate is recovered from solvent extraction stage 37 in line 59. Part of this raffinate is recycled via lines 60, 61 and 24 to second leaching stage 21. Another part is passed via line 19, as previously described, to filter press 26 for washing of the residue from the second leaching stage.

Of the raffinate in line 60 only a part is passed on in lines 61 and 24 to oxidative stage 21. The remainder is passed by way of line 62 to spray roaster 39.

Spray roaster 39 comprises a four stream spray roaster battery. The mechanism of the spray roasting process is one of high temperature hydrolysis:

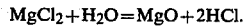

$$MgCl_2 + H_2O = MgO + 2HCl.$$

Sodium chloride which also enters with the raffinate in line 62 does not react or degrade. Any sulphate present reports as sodium or magnesium sulphate in the solid magnesium oxide product. The hydrogen chloride produced is absorbed in the wash water in line 46 to form hydrochloric acid solution which is recovered in line 63, a part of which is passed by way of line 56 to acid wash stage 55, but the major part flows on by way of lines 23 and 71 to second leaching stage 21. In addition hydrochloric acid for pH control in the first crementation vessel 8 is taken from line 23 by way of line 70.

The magnesium oxide product is recovered as indicated by line 64 and is re-slurried in sea water supplied by way of line 65. This slurry is held in slurry tanks for a sufficient period, e.g. a period of from about 30 minutes to about 8 hours, typically about 4 hours, in order to complete hydrolysis of magnesium oxide to magnesium hydroxide. From these slurry tanks the solids are pumped to a solid/liquid separation section and magnesia washing section indicated as 66. The resulting filter cake, which contains about 60 to about 65% w/w solids, is passed as indicated by line 67 to lines 32 and 38 for supply respectively to the iron purge stage 29 and to the solvent extraction stage 37. Washings from zone 66 are discarded by way of line 68 and provide a purge from the system for sodium chloride and for sulphate ions.

Make up amounts of magnesium chloride are supplied to the system by way of line 69.

The invention is further illustrated in the following Examples in which all percentages are by weight unless otherwise stated: the term "w/v" means "weight by volume".

EXAMPLE 1

440 g of wet mud solids dredged from the bottom of the Red Sea containing 200.1 g of dry salt free solids were slurried in a 2 liter flask with a lixiviant solution to give a slurry containing 9.6% w/v solids. These solids gave the following analysis: Zn, 31.07%; Fe, 18.76%; Cu, 3.55%; Co, 0.079%; Mn, 0.16%; Pb, 0.60%; $SiO_2$, 6.87%; Ag, 490 ppm; and Au, 8 ppm. The resulting slurry was heated under reflux at 103° C. and sampled at intervals. Each sample was filtered immediately and the liquid phase analysed to give the results shown in FIG. 2. The lixiviant had a pH of 2.0 and contained 160.0 g/l $MgCl_2$, 45.0 g/l NaCl, 4.5 g/l $ZnCl_2$ and 40.2 g/l $CuCl_2$, the total chloride ion concentration being about 5.0M.

EXAMPLE 2

265 g of a wet residue (containing 125 g of solids) obtained by leaching Red Sea mud solids for 20 minutes under conditions similar to those used in Example 1 were heated at 120° C. under a pressure of 60 psig (414 kPag) maintained by oxygen for 30 minutes with 985 ml of a preheated lixiviant solution (specific gravity 1.18) containing 160 g/l $MgCl_2$, 45 g/l NaCl, and 41 g/l HCl. Samples of solution were taken periodically in order to monitor the progress of the reaction, each sample being immediately filtered and then analysed. At the end of the run the remaining slurry was rapidly filtered and the solution and residue were stored separately. The filtrate analysis results are summarised in Table 1 below; the final residue gave the following analysis: Cu, 0.066%; Fe, 20.6%; Zn, 0.013%; Ag, 0.0013%; Au, 0.0031%. The recovery of zinc in this oxidative leach run was calculated to be 99.3%, whilst that of copper was calculated to be 100.0% and that of iron to be 81.9%. The overall recoveries of metals, calculated over both the reduction leach stage and the oxidative leach stage were as follows: Zn, 99.8%, Cu, 99.7%; Ag, 98.1%; Fe, over 100%.

TABLE 1

| Time (mins.) | Analysis of filtrate (g/l) | | | | | |
| --- | --- | --- | --- | --- | --- | --- |
| | Cu | Fe | Zn | $SO_4^{--}$ | eH (mv) | pH |
| 15 | 32.5 | 4.0 | 12.9 | 4.3 | 535 | 0.85 |
| 30 | 32.5 | 3.0 | 12.9 | 12.9 | 745 | 0.50 |
| 45 | 31.0 | 3.0 | 12.9 | 14.0 | 705 | 0.40 |
| 60 | 32.5 | 3.0 | 12.9 | 14.5 | 755 | 0.40 |

What is claimed is:

1. A process for recovering metal values from a zinc-containing complex sulphide material, which sulphide material further contains copper in sulphide form, comprising leaching the material in a first leaching stage under non-oxidative conditions with a controlled amount of an aqueous chloride lixiviant solution containing cupric chloride in an amount which is selected so as to solubilize at least a part of the zinc in the material and to precipitate a quantity of cupric sulphide substantially equivalent on a molar basis to the zinc leached from the material, the lixiviant solution further containing sufficient of a source of chloride ions other than cupric chloride to ensure solubilization of metal chlorides present, recovering from the first leaching stage a zinc chloride-containing leach liquor, which further contains an amount of copper ions equivalent to the copper content of the zinc-containing complex sulphide material, recovering metal values from said leach liquor in a metal recovery section, treating solids containing copper in sulphide form from the first leaching stage under oxidizing conditions in a second leaching stage with a liquor containing (i) hydrochloric acid in an amount corresponding approximately to the stoichiometric quantity required for leaching the non-ferrous metal content of the copper sulphide-containing solids and (ii) metal chlorides thereby to solubilize substantially all the non-ferrous metal values in the solids, to precipitate iron values in the form of ferric hydroxide and jarosite and to regenerate cupric chloride-containing lixiviant solution for use in the first leaching stage, and recovering from the second leaching stage (a) a solids residue consisting essentially of (i) iron values in the form of ferric hydroxide and jarosite and (ii) sulphur, which solids residue is substantially free from non-ferrous metal values, and (b) a cupric chloride-containing lixiviant solution for recycle to the first leaching stage.

2. A process according to claim 1, in which the source of chloride ions comprises magnesium chloride, calcium chloride, or a mixture of sodium and/or potassium chloride and one or both of magnesium and calcium chlorides.

3. A process according to claim 2, in which the total concentration of chloride ion including that associated with cupric chloride ranges from about 2 to about 10 moles per liter.

4. A process according to claim 1, in which the concentration of cupric chloride in the lixiviant solution ranges from about 0.4M to about 1.2M.

5. A process according to claim 1, in which the ratio of lixiviant solution to the material subjected to leaching in the first leaching stage is chosen so as to cause solubilization of from about 25% to 100% of the zinc present in the material.

6. A process according to claim 1, in which the oxidizing conditions include the supply of molecular oxygen to the second leaching stage.

7. A process according to claim 1, in which the material subjected to leaching in the first leaching stage comprises a sulphide material containing other metals in addition to zinc and copper.

8. A process according to claim 1, in which the metal recovery solution includes a first stage comprising a cementation stage in which metallic zinc is added to the leach liquor from the first leaching stage to remove by cementation metals which are below zinc, which has a published positive oxidation potential, Zn/Zn++, of +0.763 volts, in the electrochemical series.

9. A process according to claim 8, in which the solution going forward to the cementation stage is substantially in reduced form.

10. A process according to claim 8, in which the liquor is subjected to an iron removal step prior to or subsequent to said cementation step.

11. A process according to claim 10, in which the iron removal step comprises the steps of oxidizing substantially all remaining iron salts to ferric form and precipitating resulting ferric ions in oxide or hydrated oxide form.

12. A process according to claim 1, in which the metal recovery section includes a solvent extraction stage for recovery of zinc values from the liquor, in which the liquor is extracted with a liquid organic extractant phase comprising an extractant for zinc, and in which zinc-loaded extractant phase is stripped with an aqueous strip liquor.

13. A process according to claim 12, in which chloride-containing raffinate from the solvent extraction stage is passed to the second leaching stage.

14. A process according to claim 12, in which the extractant for zinc is a cationic extractant and the resulting zinc-loaded strip liquor comprises a zinc sulphate solution.

15. A process according to claim 14, in which a magnesium compound is used for pH control in the zinc extraction step.

16. A process according to claim 15, in which the magnesium compound is magnesia.

17. A process according to claim 16, in which aqueous raffinate from the zinc extraction stage is subjected to a spray roasting step to generate magnesium oxide, which is used to provide magnesium as exchange cation for zinc in the extraction step, and hydrogen chloride.

18. A process according to claim 17, in which the source of chloride ions comprises a mixture of magnesium chloride and sodium chloride and in which the spray roasting step produces a solid mixture comprising sodium chloride and magnesium oxide which is subsequently separated to give magnesium oxide and a sodium chloride containing purge stream.

19. A process according to claim 17, in which hydrogen chloride generated in the spray roasting step is passed to the second leaching stage.

20. A process according to claim 14, in which the cationic extractant comprises a substituted phosphoric acid or a salt thereof.

21. A process according to claim 20, in which the substituted phosphoric acid is di-2-ethylhexylphosphoric acid.

22. A process according to claim 14, in which the zinc-loaded strip liquor is subjected to electrolysis for recovery of metallic zinc.

23. A process according to claim 2, in which the total concentration of chloride ion including that associated with cupric chloride ranges from about 4 to about 6 moles per liter.

* * * * *